United States Patent [19]

Takahashi et al.

[11] Patent Number: 4,644,587

[45] Date of Patent: Feb. 17, 1987

[54] OPTICAL DATA COMMUNICATION SYSTEM

[75] Inventors: Yoshifusa Takahashi, Ayase; Hiroshi Kadonaga; Satoshi Ishikawa, both of Yokohama; Junichi Kikuchi, Tokyo, all of Japan

[73] Assignee: Ricoh Company, Ltd., Tokyo, Japan

[21] Appl. No.: 443,719

[22] Filed: Nov. 22, 1982

[30] Foreign Application Priority Data

Dec. 3, 1981 [JP] Japan .................................. 56-194913

[51] Int. Cl.⁴ .......................................... H04B 9/00
[52] U.S. Cl. .................................. 455/601; 370/94; 455/607; 455/612
[58] Field of Search ........... 340/825.5, 825.51, 825.71; 455/606, 607, 612, 601, 608, 617, 610, 78; 370/60, 85, 94, 16

[56] References Cited

U.S. PATENT DOCUMENTS

| | | | |
|---|---|---|---|
| 4,107,518 | 8/1978 | McMahon | 455/601 |
| 4,227,260 | 10/1980 | Yojvodich et al. | 455/601 |
| 4,233,589 | 11/1980 | Rawson et al. | 340/825.5 |
| 4,234,968 | 11/1980 | Singh | 455/607 |
| 4,347,498 | 8/1982 | Lee et al. | 370/94 |
| 4,384,363 | 5/1983 | Lipcon | 340/825.5 |
| 4,422,179 | 12/1983 | Albanese | 455/606 |
| 4,451,827 | 5/1984 | Kahn et al. | 370/60 |
| 4,464,658 | 8/1984 | Thelen | 370/16 |
| 4,531,238 | 7/1985 | Rawson et al. | 455/601 |

OTHER PUBLICATIONS

Rawson et al.–Fibernet II–Topical Meeting on Optical Fiber Communication–Apr. 13-15, 1982, Phoenix Ariz.

*Primary Examiner*—Joseph A. Orsino, Jr.
*Attorney, Agent, or Firm*—David G. Alexander

[57] ABSTRACT

An optical data communication system using an optical star repeater which converts an optical signal transmitted from a terminal unit into an electric signal, amplifies the electric signal, reconverts the amplified electric signal into an optical signal, and then distributes the optical signal to respective terminal units inclusive of the terminal unit which transmitted the optical signal. The star repeater includes collision detector means for detecting a collision condition in communication, and output control means for interrupting the distribution of the optical signal to the terminal units. The output control means is controlled by an output of collision detector means so that, in response to a collision, it is caused to cut off the signal distribution to the terminal units. Simultaneously with the cut-off of the signal distribution, a collision signal indicating the occurrence of a collision is distributed to the respective terminal units, whereby the terminal units can accurately and immediately detect the collision condition.

6 Claims, 9 Drawing Figures

Fig. 1

PRIOR ART

OPTICAL DATA COMMUNICATION SYSTEM

FIELD OF THE INVENTION

The present invention relates to an optical data communication system employing optical fibers for the exchange of data between a plurality of terminal units and, more particularly, to an optical data communication system of the type using an optical star repeater which converts an optical signal transmitted from any one of multiple terminal units into an electric signal, amplifies the electric signal, reconverts the amplified electric signal into an optical signal, and then distributes the optical signal to the respective terminal units.

A current tendency in the art of data communication is to the use of an optical data communication system employing optical fibers, which can handle a larger volume of information than traditional systems which rely on coaxial cables or the like. Various kinds of optical data communication systems have hitherto been proposed and includes one which utilizes an optical star repeater.

In such a system utilizing an optical star repeater, all the associated terminal units are connected with the star repeater by a first group of optical fibers for transmission and a second group of optical fibers for reception. An optical signal transmitted from any one of the terminal units is always distributed to all the terminal units by way of the star repeater. The respective terminal units are connected with the star repeater in a radial or star-like network to prevent the terminal units from exchanging optical signals without sharing the star repeater.

In the system of the type described, if a plurality of terminal units transmit optical signals at the same time, then a collision of the optical signals occurs at the star repeater. The collision makes it difficult to distribute information delivered from any one of them accurately without any error to the respective terminal units. Therefore, the system has to be furnished with effective means for detecting the collision condition.

The collision detector means has been constituted by a microcomputer or the like installed in each of the terminal units and constructed to interrupt the transmission of data or destroy received data. For example, it has been customary to detect a collision by the CRC (cyclic redundancy check) system and to destroy the data by suitably changing the addresses of a memory which have stored received data.

However, the conventional collision detection relying on microcomputers or the like in all the terminal units complicates the system design and adds to the cost of each terminal unit. Besides, a substantial period of time is consumed to detect a collision which renders the system unsuitable for high speed data communication.

Meanwhile, this kind of data communication system allows a terminal unit, which transmitted data, to receive the same data itself in addition to the others by way of an optical star repeater, different from the traditional data communication systems using coaxial cables or the like. The terminal unit at the transmitter's station, therefore, may be capable of detecting a collision by checking the coincidence between the data transmitted and the data received. This still involves a problem, however, due to the time lag between the transmission and reception of data which is proportional to the distance between the terminal unit and the star repeater, that is, propagation delay caused by the distance of the transmission path. The delay varies in accordance with the distance of the transmission path and, thus, difficulty is experienced in detecting a collision through the check of coincidence between transmitted and received data.

SUMMARY OF THE INVENTION

An optical data communication system embodying the present invention includes an optical star repeater which comprises an optical-to-electrical signal converter section for converting an optical signal transmitted to the star repeater by an optical fiber of a first group into an electric signal. The electric signal is amplified by a receiver section. A transmitter section amplifies the electric signal to be distributed to each of multiple terminal units, one of which has transmitted the optical signal. An electrical-to-optical signal converter section converts the electric signal supplied from the transmitter section into an optical signal. Collision detector means detects a collision condition of optical signals which may be transmitted from the terminal units of the same time and generates a collision signal. This collision detector means is installed in the optical star repeater. Output control means controls the delivery of optical signals under collision in response to the collision signal from the collision detector means. This output control means is also installed in the optical star repeater.

In accordance with the present invention, an optical data communication system uses an optical star repeater which converts an optical signal transmitted from a terminal unit into an electric signal, amplifies the electric signal, reconverts the amplified electric signal into an optical signal, and then distributes the optical signal to respective terminal units inclusive of the terminal unit which transmitted the optical signal. The star repeater includes collision detector means for detecting a collision condition in communication, and output control means for interrupting the distribution of the optical signal to the terminal units. The output control means is controlled by an output of collision detector means so that, in response to a collision, it is caused to cut off the signal distribution to the terminal units. Simultaneously with the cut-off of the signal distribution, a collision signal indicating the occurrence of a collision is distributed to the respective terminal units, whereby the terminal units can accurately and immediately detect the collision condition.

It is an object of the present invention to provide an optical data communication system which effectively detects a collision condition in communication and thereby eliminates communication errors.

It is another object of the present invention to provide an optical data communication system which is simpler in construction and lower in cost that prior art systems of the kind concerned.

It is another object of the present invention to provide an optical data communication system which accomplishes excellent reliability.

It is another object of the present invention to provide a generally improved optical data communication system.

Other objects, together with the foregoing, are attained in the embodiments described in the following description and illustrated in the accompanying drawings.

DESCRIPTION OF THE PREFERRED EMBODIMENTS

While the optical data communication system of the present invention is susceptible of numerous physical embodiments, depending upon the environment and requirements of use, substantial numbers of the herein shown and described embodiments have been made, tested and used, and all have performed in an eminently satisfactory manner.

To facilitate understanding of the invention, a brief reference will be made to a prior art optical data communication system using an optical star repeater, depicted in FIGS. 2 and 3a-3c.

Figure 1:
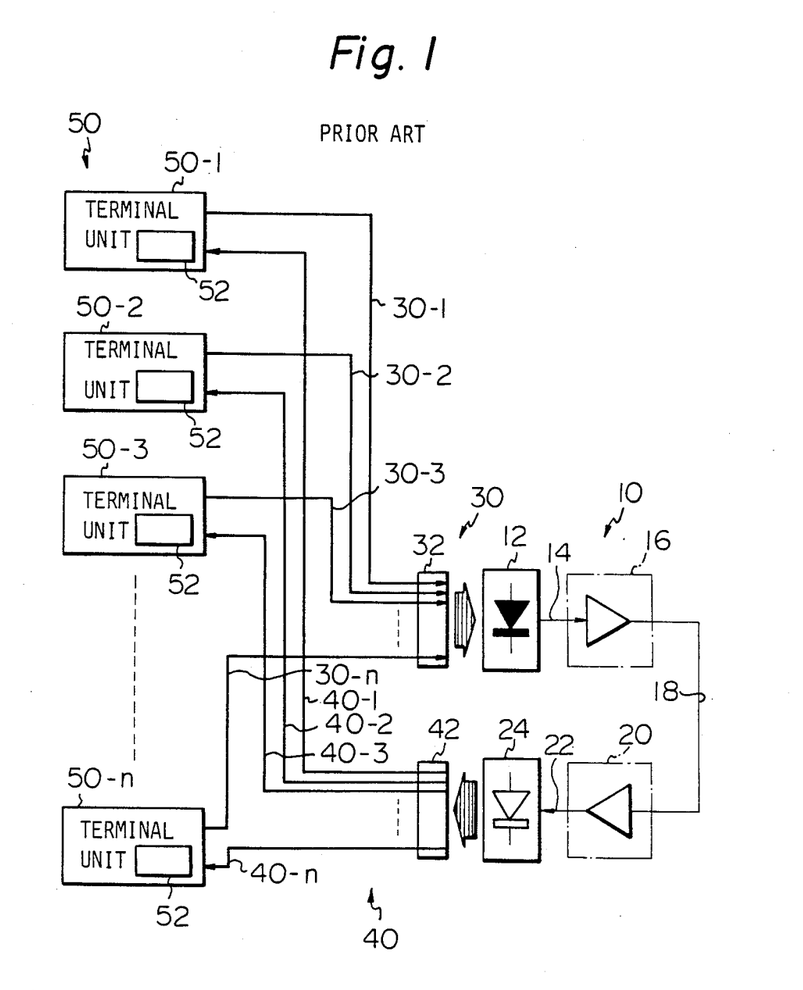
FIG. 1 is a block diagram or a prior art optical data communication system.

Referring to FIG. 1, the optical star repeater is generally designated by the reference numeral 10 and includes a photoelectric an optical-to-electrical signal conversion section 12. The electrical output of this signal conversion section 12 is supplied by a line 14 to a receiver section 16 to be amplified thereby. The amplified output of the receiver section 16 is coupled by a line 18 to a transmitter section 20 adapted to amplify the input. Further, the output of the transmitter section 20 is fed by a line 22 to an electrical-to-optical signal conversion section 24, thereby being converted into an optical signal. Thus, the star repeater 10 functions to convert an input optical signal into an electric signal, amplify the electric signal and then reconvert the electric signal into an optical signal.

A plurality of optical fibers 30-1, 30-2, 30-3, ..., 30-n are optically connected with the optical-to-electrical signal converter 12 of the star repeater, as generally denoted by the reference numeral 30. Likewise, a plurality of second optical fibers 40-1, 40-2, 40-3, ..., 40-n are optically connected with the electrical-to-optical signal converter 24, as generally denoted by the reference numeral 40. It should be noted that each of the underlined reference characters in FIG. 1, as well as in the other drawings, suggests that the component indicated thereby may be one of a plurality of similar components.

In detail, the optical fibers 30-1, 30-2, 30-3, ..., 30-n are connected with an optic fiber bundle or star coupler 32, while the optical-to-electrical signal converter 12 may be constituted by a single photodiode, for example. Optical signals coming in through the optical fibers 30-1, 30-2, 30-3, ..., 30-n are individually transmitted through the fiber bundle 32 to be transformed into electric signals by the signal converter 12. Likewise, the optical fibers 40-1, 40-2, 40-3, ..., 40-n are connected with an optic fiber bundle 42. The electrical-to-optical signal converter 24 may comprise a single light emitting diode, for example. Accordingly, an optical signal coming out from the signal converter 24 can be distributed to all the optical fibers 40.

The optical fibers 30 for transmission and those 40 for reception are commonly connected with a plurality of terminal units 50 in one-to-one correspondence. For example, a terminal unit 50-1 is connected by the optical fiber 30-1 with the fiber bundle 32 and by the optical fiber 40-1 with the fiber bundle 42. The same applies to the other terminal units 50-2, 50-3, ..., 50-n. Each terminal unit 50 is provided with a circuit for detecting collision of its associated data with others.

Figure 2:
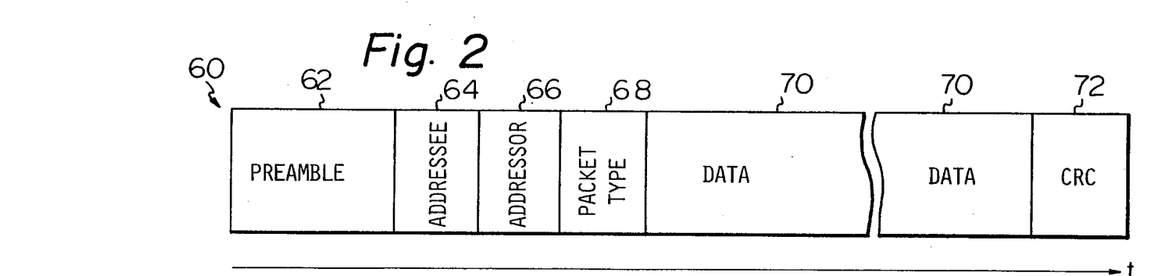
FIG. 2 is a diagram showing an exemplary format of data to be transmitted.

Referring to FIG. 2, there is shown an example of data formats which may be exchanged between the terminal units 50 by way of the star repeater 10. The abscissa in FIG. 2 indicates time t. As shown, the data format 60 is made up of a preamble 62 and five successive fields: field 64 indicating the address of a station to which data is to be transmitted, field 66 indicating the address of a station which is to transmit data, field 68 representing the type of a packet, field 70 containing print data or image data, and field 72 for CRC (cyclic redundancy check). Such a data format 60 is exchanged between terminal units or stations 50 as an optical signal.

Suppose that the terminal unit 50-1 has transmitted an optical signal 80 shown in FIG. 3a at time $t_1$ and, then, the terminal unit 50-3 has transmitted an optical signal 82 shown in FIG. 3b at time $t_2$ later than time $t_1$. The optical signal 80 has a preamble 62-1 and fields 64-1, 66-1, 68-1 and 70-1; the optical signal 82 has a preamble 62-3, and fields 64-3, 66-3, 68-3 and 70-3. The optical signal 80 fed from the terminal unit 50-1 at time $t_1$ is coupled to the fiber bundle 32 by the optical fiber 30-1 converted into an electric signal by the signal converter 12, successively amplified by the receiver section 16 and transmitter section 16 and then fed to the signal converter 18. The resulting electric signal is coupled to the fiber bundle 42 to be distributed to the terminal units 50. The optical signal 82 delivered from the terminal unit 50-3 at time $t_2$ is transmitted to the fiber bundle 32 by the optical fiber 30-3. Consequently, at time $t_2$, the optical signals 80 and 82 collide with each other at the signal converter 12 as indicated by a hatched area in FIG. 3c, thus giving rise to a communication error.

The composite signal of the optical signals 80 and 82 is transformed into an electric signal, amplified, transformed again into an optical signal and distributed to the terminal units 50, sequentially by the optical star repeater 10. The terminal units 50 detect the collision with their collision detectors 52 in response to the distributed optical signal, interrupting the data transmission or destroying the received data received so far. For example, the collision may be detected on the basis of the data stored in the CRC field 72, while the received data may be destroyed by suitably varying the addresses of a memory which have stored the data. The collision detector 52 may be constituted by a microcomputer, for example.

As described above, the prior art data communication system has to be provided with collision detectors 52 allocated to the respective terminal units 50. This complicates the system construction and thereby increases the cost of each terminal unit 50. Besides, a substantial period of time is necessary for the detection of a collision which renders the system unsuitable for high speed data communication.

In light of this, reference is made to FIGS. 4–7 which illustrate various embodiments of a new and improved optical data communication system of the present invention.

Figure 4:
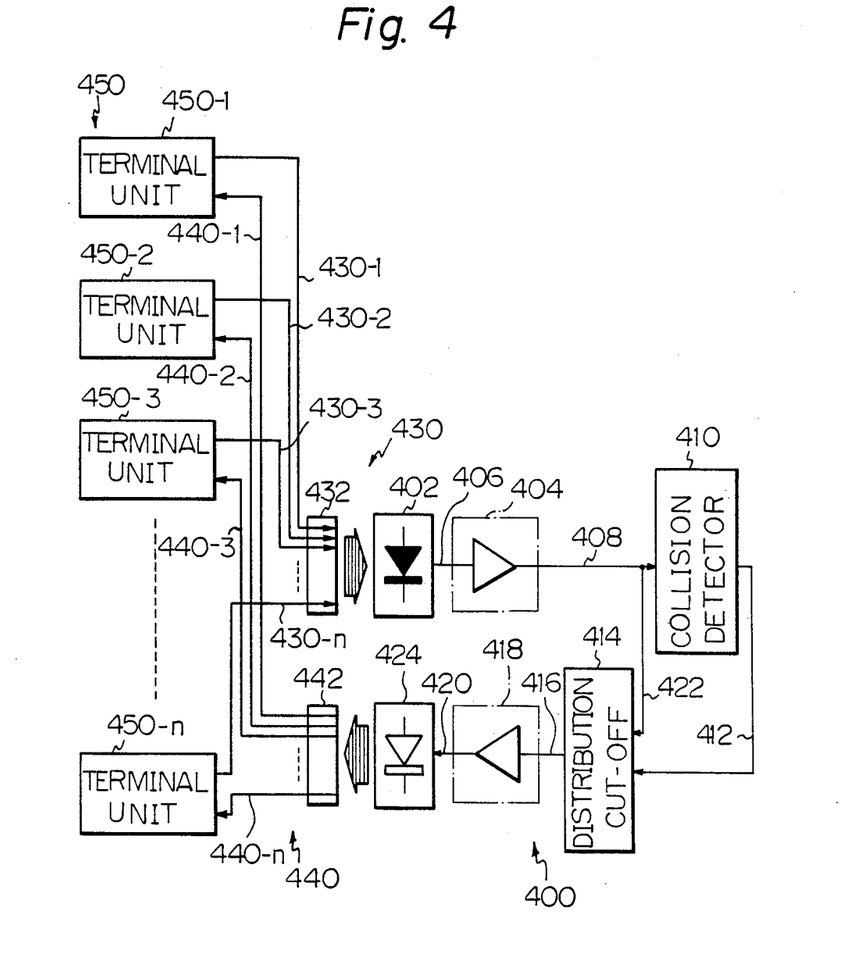
FIG. 4 is a block diagram of an optical data communication system embodying the present invention.

Referring to FIG. 4, the optical data communication system includes an optical star repeater which is generally designated by the reference numeral 400. In the optical star repeater 400, an optical-to-electrical signal conversion section 402 converts an input optical signal into an electric signal and supplies it to a receiver section 404 via a line 406. The receiver section 404 amplifies the input signal and feeds its output via a line 408 to a collision detecting device 410, which is adapted to detect a collision and deliver a collision signal as will be described. The collision signal is coupled via a line 412 to a distribution cut-off device 414 which functions to interrupt the delivery of an electric signal therethrough so as to control the output. The distribution cut-off device 414 connects via a line 416 to a transmitter section 418 adapted to amplify its input signal, the transmitter section 418 connecting via a line 420 to an electrical-to-optical signal converter 424. Thus, an optical signal appears at the output of the signal converter 424. Furthermore, the receiver section 404 is connected with the distribution cut-off device 414 by a line 422.

Thus, the optical star repeater 400 converts an input optical signal into an electric signal, amplifies it, determines whether a collision has occurred in the system and, if not, delivers an optical version of the amplified electric signal but, if so, interrupts the delivery of such an optical signal.

As in the prior art system, a first group of optical fibers 430-1 to 430-$n$ for transmission and a second group of optical fibers 440-1 to 440-$n$ for reception are laid between terminal units 450-1 to 450-$n$ and optic fiber bundles 432 and 442, respectively. While the optical fiber network is the same as in the prior art system, it will be noted that none of the terminal units 450 is provided with a collision detector circuit.

Each of the receiver section 404 and transmitter section 418 has an amplifier as its major component. The collision detector 410, on the other hand, may be constituted mainly by a comparator and constructed to detect a collision by comparing the level of an input electric signal with the level of a predetermined reference voltage. Because all the optical signals entering through the optical fibers 430 are transformed into electric signals by the common signal converter 402, any collision occurring in the manner shown in FIG. 3c results in an increase in the amount of light incident on the signal converter 402 and, accordingly, an increase in the average level of the resultant electric signal. This is because optical signals substantially consist of optical power and, hence, any collision thereof increases the statistical power level of the composite light regardless of their relative phase. The output of the collision detector 406 remains (logical) "L" level under a non-collision condition but becomes "H" level in response to a collision condition.

The distribution cut-off device 414 may comprise an AND gate or the like which is capable of AND function. The device 414 receives an electric signal from the receiver 404 and an output of the collision detector 410 and controls the transmission of the former in accordance with the logical level of the latter.

In operation, suppose that the terminal unit 450-2 has transmitted an optical signal to the star repeater 400 via the optical fiber 430-2 and fiber bundle 432. The optical signal may have the format shown in FIG. 2 though not limited thereto. The optical signal reached the star repeater 400 is transformed into an electric signal by the signal converter 402, amplified by the receiver 404 and supplied to the collision detector 410 and distribution cut-off device 414. Assuming here that the system is free from collision, then the output of the collision detector 410 is "L" level allowing the distribution cut-off device 414 to pass the electric signal from the receiver 404 therethrough. The electric signal is amplified by the transmitter 418, converted into an optical signal by the signal converter 412 and then distributed to the respective terminal units 450 via the fiber bundle 442 and optical fibers 440.

Figure 3A:
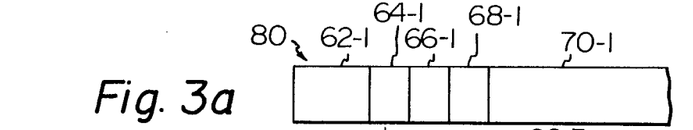
FIGS. 3a-3c are diagrams explanatory of a collision condition of data.
Figure 3B:
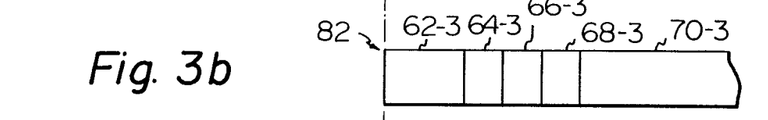
Figure 3C:
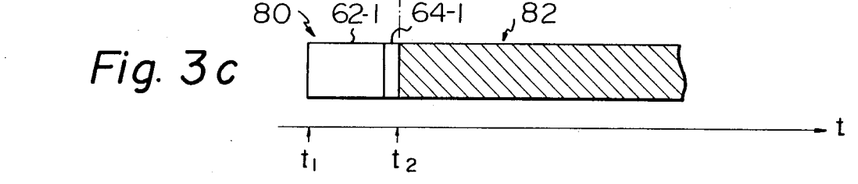

Next, suppose that the optical signal 80 shown in FIG. 3a has been outputted at time $t_1$ from the terminal unit 450-3 and, thereafter, the optical signal 82 shown in FIG. 3b at time $t_2$ from the terminal unit 450-$n$ by way of example. The optical signal 80 is fed by the optical fiber 430-3 to the fiber bundle 432 and then transformed into an electric signal by the signal converter 402. the electric signal is amplified by the receiver 404 the output of which is coupled to the collision detector 410 and distribution cut-off device 414. For the interval between times $t_1$ and $t_2$, in which collision does not occur, the collision signal from the collision detector 410 remains "L" level so that the electric signal coupled from the receiver 404 to the distribution cut-off device 414 is passed to the terminal units 450 via the transmitter 418, signal converter 424 and fiber bundle 442.

At time $t_2$, the optical output 82 from the terminal unit 450-$n$ is fed to the fiber bundle 432 via the optical fiber 430-$n$. As a result, a composite signal of the optical signals 80 and 82 becomes incident on the optical-to-electrical signal converter 402. This is the collision indicated by the hatched area in FIG. 3c, giving rise to a communication error.

In accordance with the present invention, the composite optical signal is converted into an electric signal by the converter 402, amplified by the amplifier 404 and then coupled to the collision detector 410 and distribution cut-off device 414. The collision signal on the line 412 becomes logical "H" level this time and, accordingly, the distribution cut-off device 414 interrupts the passage of the electric signal to the signal converter 424 for a predetermined period of time. Thus, the interruption of the relay at the star repeater 400, that is, the interruption of reception of the optical signal at each terminal unit 450 indicates the collision condition. It will be seen that the collision detector means installed not in the terminal units 450 but in the star repeater 400 promotes the construction of a simpler and less expensive optical data communication system.

Figure 5:
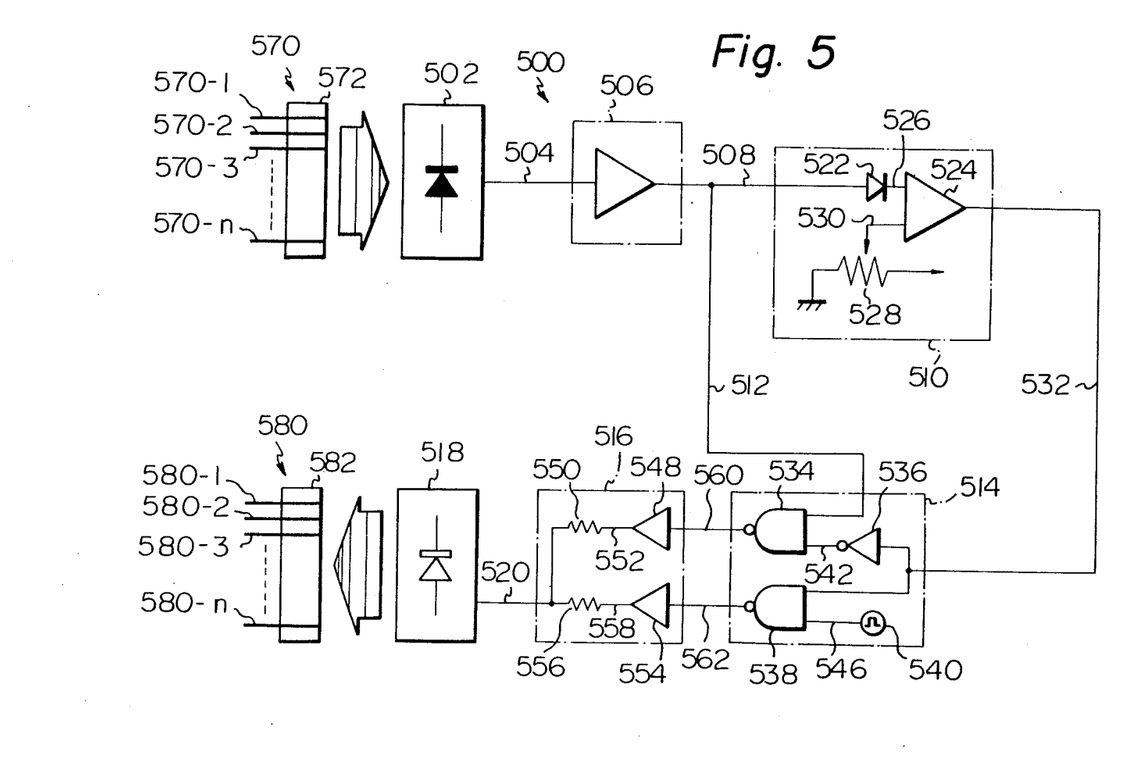
FIG. 5 is a block diagram showing another embodiment of the present invention.

Referring to FIG. 5, another embodiment of the present invention is shown. In this embodiment, the connection between the first and second groups of optical fibers and the respective terminal units is made in the same way as in FIG. 4 and, therefore, omitted from the illustration for simplicity purpose. Also, those sections in FIG. 5 which are common to those of FIG. 4 will not be described any further.

In FIG. 5, an optical star repeater 500 includes an optical-to-electrical signal converter 502 adapted to transform an input optical signal into an electric signal. The signal converter 502 connects via a line 504 to a receiver 506 which in turn connects via a line 508 to a collision detector device 510 and via a line 512 to an output control device 514. The output control device 514 is adapted to interrupt the delivery of an electric signal or to deliver a collision signal as will be described. A transmitter section 516 serves to deliver either an electric data signal or a collision signal to an electrical-to-optical signal converter 518 via a line 520 after amplifying it.

The collision detector 510 includes a diode 522 for the prevention of reverse current flow which is connected with the line 508. The output of the diode 522 is connected to one input of a comparator 524 by a line 526. The other input of the comparator 524 is connected with a variable resistor 528 by a line 530, the variable resistor 528 being connected with a power supply (not shown). The variable resistor 528 is adjustable to supply the comparator 524 with a desired reference voltage. The comparator 524, comparing the output signal of the receiver 506 with the reference voltage, produces a collision signal whose logical level is "H" if the former is higher than the latter and "L" if otherwise. The output of the comparator 524 is connected with the output control 514 by a line 532.

The output control 514 comprises a distribution cut-off circuit made up of a NAND gate 534 and an interver 536, and a collision signal generation circuit made up of a NAND gate 538 and an oscillator 540. The line 532 from the collision detector 510 connects to the inverter 536 and one input of the AND gate 538. The line 512 from the receiver 506 connects to one input of the NAND gate 534. The output of the inverter 536 is connected by a line 542 with the other input of the NAND gate 534. The oscillator 540 is connected with the other input of the NAND gate 538 by a line 546.

In the output control 514 having the above construction, the distribution cut-off circuit serves to interrupt the delivery of an electric signal in a collision condition. In a non-collision condition, the output of the collision detector 510 remains "L" level and this is inverted by the inverter 536 to "H" level. Then, the NAND gate 534 becomes "open" to pass an inverted version of the output signal of the receiver 506 therethrough to the transmitter 516. Upon collision, the output signal of the collision detector 510 becomes logical "H" level to make the NAND gate 534 "closed", thereby intercepting the electric signal coupled from the receiver 506 to the NAND gate 534. In this manner, the distribution cut-off circuit functions to interrupt the delivery of an electric signal and thereby makes it impossible to relay an optical signal in response to a collision. Meanwhile, the collision signal generator circuit is adapted to deliver a collision signal generated by the oscillator 540 in the event of a collision. While the system is free from collision, the output on the line 532 is "L" level so that the NAND gate 538 is maintained "closed" to block the supply of the collision signal. Upon collision, the NAND gate 538 is made "open" by the "H" level output on the line 532, allowing the passage of the collision signal therethrough. In short, the collision signal generator of the output control 514 supplies the transmitter 516 with the collision signal in place of the electric signal which is interrupted under the collision condition.

The transmitter 516 comprises two sections: a data signal transmitting section constituted by an amplifier 548 and a resistor 550 connected with the amplifier 548 by a line 552, and a collision signal transmitting section constituted by an amplifier 554 and a resistor 556 connected with the amplifier 554 by a line 558. The NAND gate 534 connects to the amplifier 548 via a line 560 while the NAND gate 538 connects to the amplifier 554 via a line 562. While the resistors 550 and 556 are current limiting resistors, they may be omitted depending on the construction of their associated amplifiers 548 and 554. The amplifiers 548 and 554 are individually of the inversion type the output signal of which is an inverted version of an input signal. With this construction, the data transmitting section with the amplifier 548 amplifies the electrical output of the receiver 506, while the collision signal transmitting section amplifies the collision signal from the output control 514.

A plurality of optical fibers 570-1, 570-2, 570-3, ..., 570-n (generally denoted by the reference numeral 570) are optically connected with the optical-to-electrical signal converter 502 by a fiber bundle 572. Likewise, a plurality of optical fibers 580-1, 580-2, 580-3, ..., 580-n (generally denoted by the reference numeral 580) are optically connected with the electrical-to-optical signal converter 518 by a fiber bundle 582.

The data communication system described above with reference to FIG. 5 will be operated as follows.

In a non-collision condition, the electric signal coupled from the receiver 506 to the comparator 524 remains lower in level than the reference voltage so that the signal on the line 532 is kept "L" level. In this situation, the electric signal from the receiver 506 is allowed to pass through the output control 514 to the transmitter 516. The electric signal, after being amplifier by the transmitter 516, is transformed into an optical signal by the signal converter 518 and then distributed to the respective terminal units.

Upon collision, the electric signal fed from the receiver 506 to the comparator 524 grows higher than the reference voltage making the output of the comparator 524 "H" level. Then, the output control 514 supplies the transmitter 516 with a collision signal. The collision signal is amplified by the transmitter 516, converted into an optical signal by the signal converter 518 and distributed to the respective terminal units, instead of the electric signal from the receiver 506.

Thus, in the embodiment shown in FIG. 5, each terminal unit has to distinguish a collision signal and a data signal, i.e. electric output of the receiver 506, from each other. A first expedient to meet this requirement may be providing different amplification rates to the amplifiers 548 and 554 of the transmitter 516, so that the collision signal and data signal may differ in level from each other. For example, the amplification rates may be such that the level of the collision signal is higher than that of the data signal. A second expedient may be employing different periods for the collision signal and data signal, which is readily achievable through the adjustment of the period of the output of the oscillator 540. Where signal exchange between the terminal units is based on the PCM (pulse code modulation) system, for instance, an arrangement may be made such that the duration or period of pulses contained in a pulse train which constitute the data signal differs from that of pulses contained in the collision signal. Such a collision signal will permit each terminal unit to quickly detect a collision condition.

Figure 6:
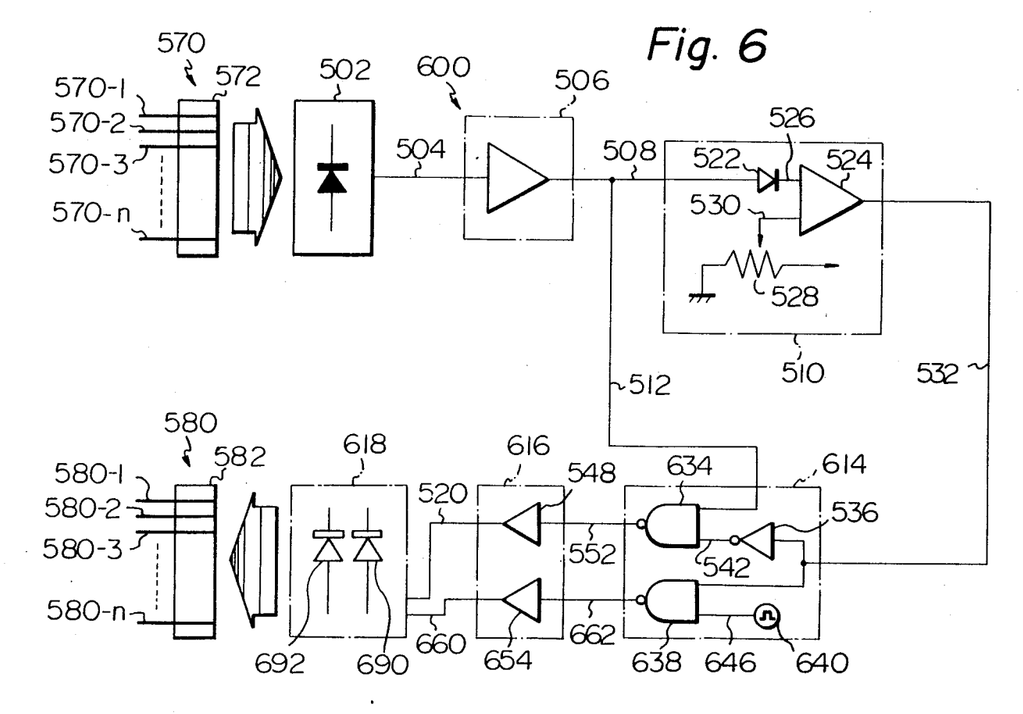
FIG. 6 is a block diatram showing another embodiment of the present invention.

Referring to FIG. 6, there is shown another embodiment of the present invention which embodies a third expedient for the discrimination between the collision signal and the data signal. This embodiment is essentially similar to the embodiment of FIG. 5 and, therefore, the same components are designated by like numerals and the description thereof will be omitted for simplicity.

In FIG. 6, the collision detector 510 is connected by the line 532 with a NAND gate 638 of an output control device 614. The NAND gate 638 corresponds to the NAND gate 538 shown in FIG. 5. An oscillator 640 is connected with the other input of the NAND gate 638 by a line 646. The oscillator 640 corresponds to and may be the same as the oscillator 540 shown in FIG. 5. The collision signal from the oscillator 640 may take any suitable form; for example, the pulse period does not need particular consideration.

The NAND gate 638 is connected by a line 662 with an amplifier 654 of a transmitter 616. The amplifier 654 corresponds to and may even be the same as the amplifier 554 shown in FIG. 5. The amplification rate of the amplifier 654 relative to that of the amplifier 548 may be selected as desired. In FIG. 6, the resistors 550 and 556 of FIG. 5 are not shown for simplicity.

An electrical-to-optical signal converter 618 includes light emitting diodes or LED's 690 and 692. The amplifier 548 connects to the LED 690 via the line 520 while the amplifier 654 connects to the other LED 692 via a line 660. The LED 690 corresponds to the one used in the electrical-to-optical signal converter 518 indicated in FIG. 5. The LED 692 emits light of a wavelength which differs from the wavelength of light which will be emitted from the other LED 690.

In operation, while in a non-collision condition, the system of FIG. 6 operates in the same manner as the system of FIG. 5. The LED 690 is driven by an electric signal delivered thereto from the amplifier 548, converting the electric signal into an optical signal and supplying it to each terminal unit. In response to a collision, a collision signal from the oscillator 640 is amplified by the amplifier 654 and fed to the LED 692. The collision signal is converted into an optical signal by the LED 692 and distributed to each terminal unit. Thus, each terminal unit is allowed to quickly identify the collision condition due to the difference in wavelength between the light entraining the collision signal and the light entraining the data signal.

Figure 7:
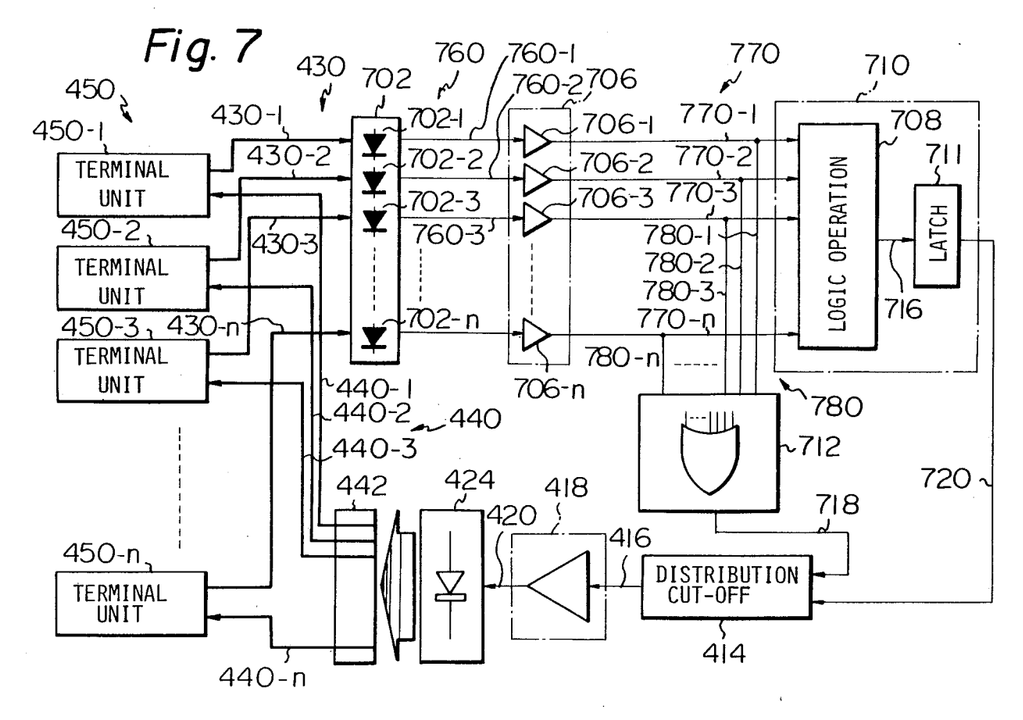
FIG. 7 is a block diagram showing still another embodiment of the present invention.

Referring to FIG. 7, still another embodiment of the present invention is illustrated. In FIG. 7, the same structural elements as those shown in FIG. 4 are denoted by like reference numerals and will not be described any further. As shown, the optical fibers 430-1, 430-2, 430-3, . . . , 430-n respectively extending from the terminal units 450-1, 450-2, 450-3, . . . 450-n connect optically to light receiving elements 702-1, 702-2, 702-3, . . . , 702-n. That is, an optical-to-electrical converter 702 is provided with the light receiving elements which correspond in number to the terminal units 450, each light receiving element serving as an optical-to-electrical converter independent of the others. An optical signal from each terminal unit, therefore, is converted by its associated light receiving element into an electric signal.

The light receiving elements 702-1, 702-2, 702-3, . . . , 702-n are respectively connected with amplifiers 706-1, 706-2, 706-3, . . . , 706-n by lines 760-1, 760-2, 760-3, . . . , 760-n. Thus, a receiver 706 is made up of the amplifiers which correspond in number to the terminal units 450 and individually constitute receiver sections. Electric signals from the signal converter 702, therefore, are amplified and delivered terminal unit by terminal unit.

The amplifiers 704-1, 704-2, 704-3, . . . , 704-n are respectively connected with an operating section 708 of a collision detector 710 by lines 770-1, 770-2, 770-3, 770-n, and with an OR gate 712 by lines 780-1, 780-2, 780-3, . . . , 780-n. With this network, electric signals amplified by the receiver 706 are individually coupled to the operating section 708 and OR gate 712. The operating section 708 performs suitable logical operation on the input electric signals to detect a collision condition in the system. The output of the operating section 708, i.e. collision signal, remains "L" level in a non-collision condition but changes to "H" level in a collision condition. The OR gate 712 provides OR of the input electric signals and supplies it to the distribution cut-off device 414 via a line 718.

The collision detector 710 also includes a latch circuit 711 to which the operating section 708 connects via a line 716. The latch circuit 711 is adapted for temporary storage of an output of the operating section 708. The latch circuit 711 is connected to the distribution cut-off device 414 by a line 720.

In operation, suppose that the terminal unit 450-2 has transmitted an optical signal to the optical star repeater shown in FIG. 7, in a non-collision condition of the system. Then, the optical signal is transformed into an electric signal by the light receiving element 702-2 of the signal converter 702, amplified by the amplifier 706-2 of the receiver 706, and coupled to the operating section 708 and OR gate 712. The electric signal is passed through the OR gate 712 to reach the distribution cut-off device 408. The operating section 708, on the other hand, determines the current condition as a non-collision condition due to the absence of outputs of the other amplifiers 706-1, 706-3, . . . , 706-n, that is, outputs of the other terminal units 450-1, 450-3, . . . , 450-n. Therefore, the output of the operating section 708 is "L" level and this is delivered to the latch 711. In this situation, the distribution cut-off device 414 allows the electric signal from the OR gate 712 to pass therethrough. The electric signal is converted into an optical signal and distributed to each terminal unit 450 through the procedure previously described.

When some of the terminal units, such as 450-1 and 450-3, have emitted optical signals at the same time to cause collision at the star repeater, electrical signals from the amplifiers 706-1 and 706-3 are coupled to the operating section 708. Then, the operating section 708 identifies the collision to make its output "H" level. Thus, the operating section 708 carries out logical operation which determines the current condition as a collision condition if at least two of the amplifiers 706 have produced electric signals. The collision signal from the operating section 708 is stored for a moment in the latch 711 while being fed to the distribution cut-off device 414. Though a composite signal of the electric signals from the amplifiers 706-1 and 706-3 has been supplied to the device 414 via the OR gate 712, it is prevented by the device 414 from being distributed to any one of the terminal units 450. This cut-off of signal distribution is detected by each terminal unit 450 as a collision. This embodiment is advantageous in that a collision can be detected without resorting to a reference voltage for comparison and, accordingly, without being affected by possible fluctuation of the reference voltage.

In summary, it will be seen that the present invention provides an optical data communication system which effectively detects the collision of signals and thereby precludes communication errors. Besides, the system of the invention is simple in construction, excellent in reliability and low in cost.

Various modifications will become possible for those skilled in the art after receiving the teachings of the present disclosure without departing from the scope thereof. For example, the circuit arrangements shown and described are merely for illustrative purpose and may be replaced with other suitable ones. In the embodiment shown in FIG. 7, the distribution cut-off device 414, transmitter 418 and/or electrical-to-optical converter 424 may be constructed as indicated in FIG. 5 or 6. Furthermore, any desired number of terminal units not less than two may be connected with the optical star repeater, because the system of the invention affords the various advantages described as long as the number of terminal units is two or more.

What is claimed is:

1. In an optical data communication system having a plurality of terminal units which are connected with an optical star repeater by a first group of optical fibers for data transmission and a second group of optical fibers for data reception, the optical star repeater relaying an optical signal transmitted thereto from one of the terminal units via one of the first group of optical fibers which is associated with said one terminal unit and distributing the optical signal to the respectivel terminal units through the second group of optical fibers, said optical star repeater comprising:

an optical-to-electrical signal converter section for converting the optical signal fed to the star repeater by the optical fiber of the first group into an electric signal;

a receiver section for amplifying the electric signal outputted from said optical-to-electrical signal converter section;

a transmitter section for amplifying the electric signal coupled thereto from said receiver section to be distributed to the respective terminal units;

an electrical-to-optical signal converter section for converting the electric signal supplied from said transmitter section into an optical signal and feeding said optical signal to the second group of optical fibers;

collision detector means for determining a current condition as a collision condition while optical signals are transmitted from at least two of the terminal units to the star repeater simultaneously and received by the optical-to-electrical signal converter section and fed from the optical-to-electrical signal converter section to the collision detector means and generating a collision signal for the duration of the collision condition; and output control means for inhibiting the delivery of optical signals from the optical star repeater in collision while the collision signal is generated by said collision detector means;

the optical-to-electrical signal converter section receiving all the input optical signals which are to be converted into electrical signals;

the collision detector means detecting a collision condition based on the level of the electrical signal which has been amplified by the receiver section;

the collision state being detected by comparing the level of the electrical signal with a predetermined reference level;

the output control means comprising distribution cut-off means for passing the electric signal from the receiver section therethrough in a non-collision condition while interrupting the passage of the electric signal therethrough in a collision condition, and collision signal output means for outputting a collision signal in a collision condition, the transmitter section comprising a data transmitting section for amplifying the electric signal from the distribution cut-off means and a collision signal transmitting section for amplifying the collision signal.

2. The optical star repeater as claimed in claim 1, in which the collision signal fed from the collision signal transmitting section has a level which is different from a level of the electric signal fed from the data transmitting section.

3. The optical star repeater as claimed in claim 1, in which the collision signal from the collision signal transmitting section has a period which is different from a period of the electric signal fed from the data transmitting section.

4. The optical star repeater as claimed in claim 1, in which the electrical-to-optical signal converter section comprises first converter means for converting the electric signal from the data transmitting section into an optical signal having a first wavelength, and second converter means for converting the collision signal from the collision signal transmitting section into an optical signal having a second wavelength.

5. The optical star repeater as claimed in claim 1, in which the optical-to-electrical signal converter section comprises conversion means which are connected to the terminal units in one to one relation to convert input optical signals into electric signals independently of each other, the receiver section amplifying the independent input electric signals individually, the collision detector means detecting a collision condition and generating a collision signal by performing a predetermined logical operation on electric signals coupled thereto from the receiver section, the outputs of tne receiver section being subjected to a logical OR.operation and then coupled to the output control means.

6. An optical data communication system comprising a plurality of terminals operatively interconnected by optical fibers and an optical star repeater, the system being characterized in that the star repeater comprises collision detector means for detecting a collision condition in which signals are received by the star repeater from at least two of the terminals simultaneously;

the collision detector means comprising means for inhibiting transmission of signals from the star repeater to the terminals for the duration of the collision condition;

the collision detector means further comprising means for controlling the star repeater to transmit a collision signal to the terminals upon detection of the collision condition.

* * * * *

UNITED STATES PATENT AND TRADEMARK OFFICE
CERTIFICATE OF CORRECTION

PATENT NO. : 4,644,587

DATED : February 17, 1987

INVENTOR(S) : Yoshifusa Takahashi et al.

It is certified that error appears in the above-identified patent and that said Letters Patent is hereby corrected as shown below:

On the title page the Assignee Data should read

-- [73] Assignee: Ricoh Company, Ltd., Tokyo, Japan and
The Furukawa Electric Company, Ltd.,
Tokyo, Japan --.

Signed and Sealed this

Eighth Day of December, 1987

Attest:

DONALD J. QUIGG

*Attesting Officer*  *Commissioner of Patents and Trademarks*